(12) United States Patent
Jesari

(10) Patent No.: US 12,721,474 B2
(45) Date of Patent: Sep. 1, 2026

(54) CHARCOAL BARBECUE

(71) Applicant: Mario Jesari, Ancona (IT)

(72) Inventor: Mario Jesari, Ancona (IT)

( * ) Notice: Subject to any disclaimer, the term of this patent is extended or adjusted under 35 U.S.C. 154(b) by 905 days.

(21) Appl. No.: 17/961,655

(22) Filed: Oct. 7, 2022

(65) Prior Publication Data

US 2023/0121020 A1 Apr. 20, 2023

(51) Int. Cl.
*A47J 37/07* (2006.01)
*F23Q 25/00* (2006.01)
*F24B 3/00* (2006.01)
*F24B 5/06* (2006.01)

(52) U.S. Cl.
CPC ....... *A47J 37/0704* (2013.01); *A47J 37/0754* (2013.01); *A47J 37/0786* (2013.01); *F23Q 25/00* (2013.01); *F24B 3/00* (2013.01); *F24B 5/06* (2013.01)

(58) Field of Classification Search
CPC ................ A47J 37/0704; A47J 37/0754; A47J 37/0786; F23Q 25/00; F24B 3/00; F24B 5/06
USPC ........................................................ 126/25
See application file for complete search history.

(56) References Cited

U.S. PATENT DOCUMENTS 4,852,476 A * 8/1989 Sanchez .............. A47J 37/0745 99/393
5,257,169 A * 10/1993 Walendziak ........ A47J 37/0786 126/213
5,884,554 A * 3/1999 Sprick .................. A47J 37/041 99/449
6,047,694 A * 4/2000 Landstrom .............. A62C 3/00 126/41 R
6,435,172 B1 * 8/2002 Freemon ................ F24B 1/193 126/25 B
2009/0020109 A1 * 1/2009 Rheault .................. A47J 33/00 165/185
2010/0024798 A1 * 2/2010 Sampson ........... A47J 37/0786 126/25 R
2019/0282027 A1 * 9/2019 Weaver .............. A47J 37/0704

* cited by examiner

*Primary Examiner* — David J Laux
(74) *Attorney, Agent, or Firm* — Woodard, Emhardt, Henry, Reeves & Wagner, LLP

(57) ABSTRACT

The present invention refers to a barbecue equipped with: a) a brazier, b) at least one grill placed above the brazier and suitable for housing the food to be cooked, c) a series of contiguous vertical walls arranged above the brazier and suitable to surround the brazier itself and to create an empty space interposed between the brazier and the at least one grill. Furthermore, the barbecue of the present invention comprises an air delivery system and a water delivery system provided with the same plurality of nozzles, arranged at the contiguous vertical walls and adapted to deliver, alternatively, air or water.

7 Claims, 5 Drawing Sheets

5
12
60
3
8
6
60
8
30
1
60

CHARCOAL BARBECUE

FIELD OF THE INVENTION

This invention refers to a charcoal barbecue. In particular, this invention refers to a charcoal barbecue equipped with structural elements that make it more comfortable and easier to perform the cooking of the food placed onto the barbecue grill.

BACKGROUND

Typically, charcoal barbecues currently available on the market are equipped with a fixed grill onto which the food to be cooked is placed, while the charcoal is prepared for combustion under the grill.

However, such known in the art barbecues have the problem that, since the grill is fixed, the personnel assigned to cooking such foods must continuously rotate the foods arranged onto the grill in order to obtain uniform cooking, thus avoiding possible burns in some portions of the food.

Furthermore, in such known in the art barbecues, once the charcoal is activated, the cooking of the foods placed onto the grill is determined by the fire emitted by the charcoal itself, without the possibility of being able to intervene in an appropriate manner to make the cooking more effective.

The Applicant of the present invention has underlined the need to create a charcoal barbecue allowing a more effective cooking food.

SUMMARY OF THE INVENTION

The Applicant of the present invention has in fact surprisingly found that the aforementioned technical problem can be solved in an effective and reliable way by means of a barbecue equipped with: a) a brazier, b) at least one grill placed above the brazier and suitable for housing the food to be cooked, c) a series of contiguous vertical walls arranged above the brazier and able to surround the brazier itself and to create an empty space interposed between the brazier and the at least one grill. Furthermore, the barbecue of the present invention comprises d) an air delivery system adapted to deliver air into said empty space, and e) a water delivery system adapted to deliver water into said empty space, wherein said air delivery system and said water delivery system are provided with the same plurality of nozzles arranged at said contiguous vertical walls and adapted to deliver, alternatively, air or water.

In this way, the air delivery in said empty space is useful to both facilitate the combustion ignition and to fire maintaining.

Conversely, the water delivery is useful in case of need to extinguish any flames released, but without wetting the food being cooked.

In this way, using the same water and air delivery system, the water can be vaporized as needed, during cooking, using the same nozzles.

Therefore, the elements present in the barbecue of the present invention make cooking food on the grill more practical and easier to perform, also improving cooking performance.

According to a preferred embodiment, said plurality of nozzles consists of at least four, preferably at least six nozzles, preferably equally spaced from each other.

In this way it is possible to uniformly deliver air and/or water throughout said empty space in the cooking zone.

According to a preferred embodiment, said water delivery system further comprises: i) a container adapted to contain water, ii) a plurality of pipes wherein each pipe connects said container with a corresponding nozzle of said plurality of nozzles, and iii) a pump for allowing the water transfer from the container to said plurality of nozzles.

In this way it is possible to transfer the desired amount of water from the water container to the nozzles, through the pump and the pipes.

According to a preferred embodiment, said air delivery system also comprises an air compressor.

According to a preferred embodiment, said container suitable for containing water and said pump are positioned in what is here defined as the "service compartment", that is a section of the barbecue placed next to the "cooking compartment" which is instead placed at the brazier and the grill.

According to a preferred embodiment, the so called "service compartment" is smaller than the "cooking compartment".

According to a preferred embodiment, the barbecue of the present invention also comprises a device for directly or remotely managing the air and/or water delivery to said plurality of nozzles.

In this way, the user can easily manage the correct amount of water and/or air to be sent to the nozzles for the respective deliveries via a keypad.

According to a preferred embodiment, said device for directly or remotely managing the air and/or water delivery to said plurality of nozzles is an electric remote control, possibly provided with rechargeable batteries.

According to a preferred embodiment, each of said at least one grill consists of two grill portions connected to each other and adapted to house the food to be cooked.

In this way, the food to be cooked can be inserted into the grill without the risk that such food could fall due to gravity in the event of the grill overturning.

According to a preferred embodiment, said at least one grill is provided with at least one anti-slip handle.

In this way, the user can grip the handle with confidence, without the risk that the grill can slip out of his hand.

According to a preferred embodiment, said at least one handle is fireproof.

In this way, the grill handle can also be positioned near the fire, without the risk that the handle itself can heat up to the point of catching fire.

According to a preferred embodiment, said barbecue also comprises a movement system capable of simultaneously carrying out a) a 180° rotation of said at least one grill so as to overturn it up-down, and vice versa, and b) sliding said brazier upward and/or downward.

In this way, the upward and/or downward sliding of said brazier allows the grill to have the necessary space to execute a rotation of 180° (top-bottom, and vice versa).

In this way, two synchronized movements are obtained allowing the cooking of the food inserted in the grill, alternately, on two sides, with minimum effort, in a practical way, and with excellent cooking results.

According to a preferred embodiment, the barbecue of the present invention further comprises tracks designed to favour said brazier upward and downward sliding.

According to a preferred embodiment, the barbecue of the present invention further comprises stability elements, such as, for example, spheres, positioned at each of the brazier corners.

In this way, the brazier movement is guided and made stable by the rails and by the spheres.

According to a preferred embodiment, said movement system comprises: a) a plate, able to engage with both said brazier and said grill, b) a mechanical lever able to be operated by the user, c) a bar able to be activated by the movement of said mechanical lever and to transmit to said plate the energy to simultaneously activate said 180° rotation of said at least one grill and said brazier upward and/or downward sliding.

In this way, the plate connected to the mechanical lever by means of the bar allows these simultaneous movements of the brazier (upward and downward) and of the grill (180° rotation, upside down).

According to a preferred embodiment, said plate is positioned below said brazier.

According to a preferred embodiment, the barbecue of the present invention further comprises a support structure in the shape of a "C", fixed to the barbecue, suitable for allowing the insertion of said at least one grill into it, and supported by a vertical axis allowing the 180° rotation together with said grill inserted in it.

According to a preferred embodiment, said C-shaped structure is extendable and adjustable in length.

In this way, it is possible to use one or two grills, side by side, depending on the need.

According to a preferred embodiment, the barbecue of the present invention further comprises a protection device, arranged to cover the barbecue.

In this way, the barbecue is protected from bad weather.

According to a preferred embodiment, said protection device is provided with two extensible elements, each of them being laterally extensible in an opposite direction of the other extensible element, with respect to the longitudinal direction of the barbecue, such as wings.

In this way, said laterally extensible elements can be used as a practical support and working surface during use, while they can be returned to the "rest" position (before being extended for use) to facilitate the barbecue transport and storage.

According to a preferred embodiment, the barbecue of the present invention further comprises at least a lighting source, for example LEDs.

In this way, the use of the barbecue is allowed even in poor light conditions.

According to a preferred embodiment, said at least one lighting source is fixed to a support vertically rising from one of said extensible elements of the protection device.

According to a preferred embodiment, a second lighting source is fixed to said support that vertically rises from the other of said extensible elements of the protection device.

In this way, having two lighting sources symmetrically arranged at the opposed ends of the barbecue, it is possible to obtain a greater illumination onto the barbecue.

Further features and advantages of the present invention will be better highlighted by examining the following detailed description of a preferred, but not exclusive, embodiment of the invention, illustrated by way of non-limiting example, with reference to the following figures wherein.

DETAILED DESCRIPTION

Figure 1:
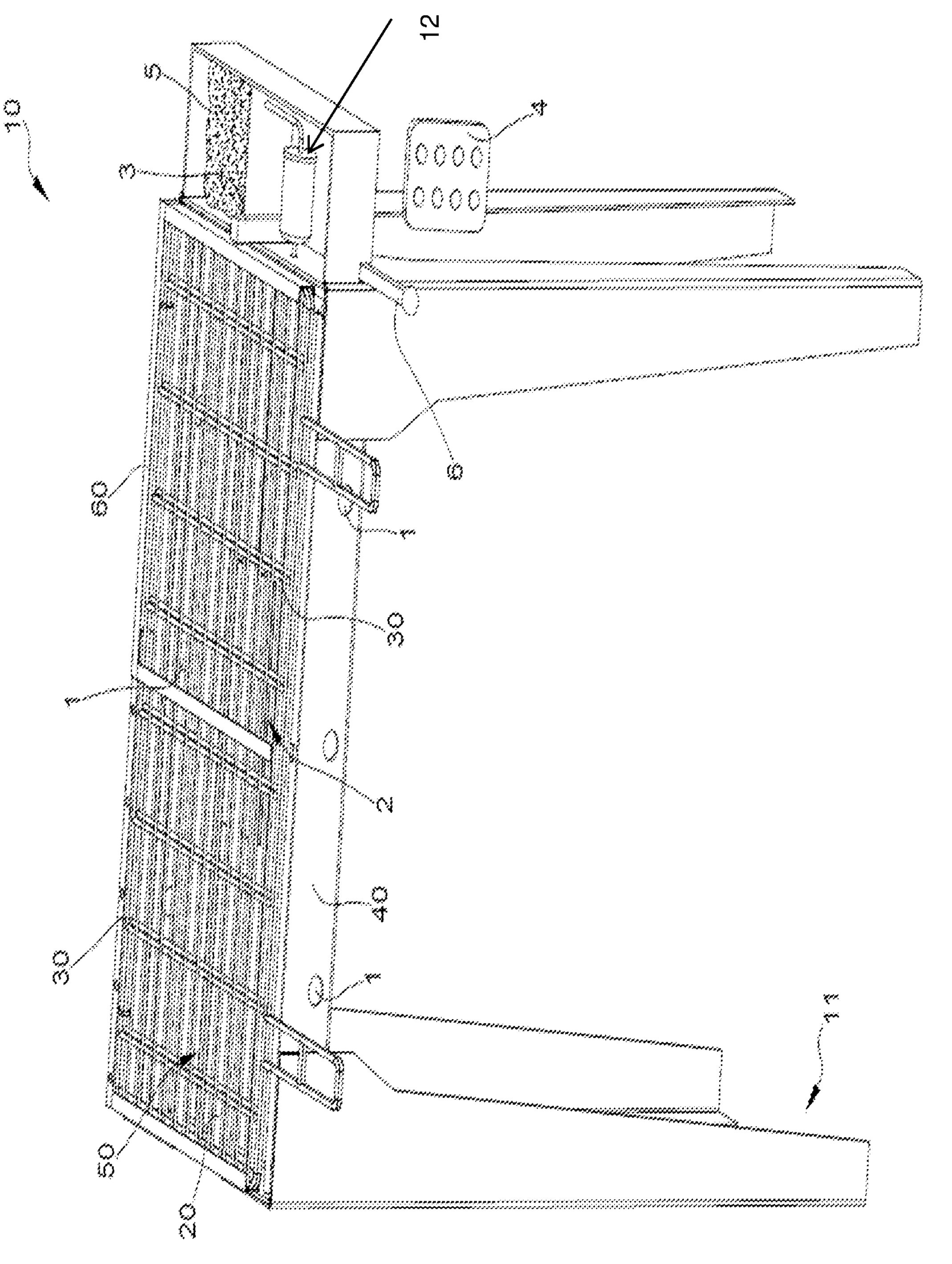
FIG. 1 shows a perspective view of an embodiment of a barbecue of this invention.

The following detailed description refers to a particular embodiment of this invention, without limiting its content.

Referring to FIGS. 1-5, an embodiment of a barbecue 10 of this invention is described, wherein a brazier 20, whose perimeter is delimited by contiguous vertical walls 40, is shown. A C-shaped structure 60 extendable and adjustable in length, and supported by a vertical axis 3, is arranged above the brazier 20; inside the C-shaped structure 60, a pair of grills 30 is inserted, able to house the food to be cooked at their inside (not shown in the figures). In this way, an empty space 50 is created between the brazier 20, the pair of grills 30 and the contiguous vertical walls 40. All the elements mentioned above contribute to form the portion of the barbecue 10 here defined as the "cooking compartment". In the embodiment shown in the figures, there are two C-shaped structures 60, one adjacent to the other, a grille 30 being inserted in each of them. Each grill 30 consists of two portions connected to each other and able to house the food to be cooked.

Figure 2:
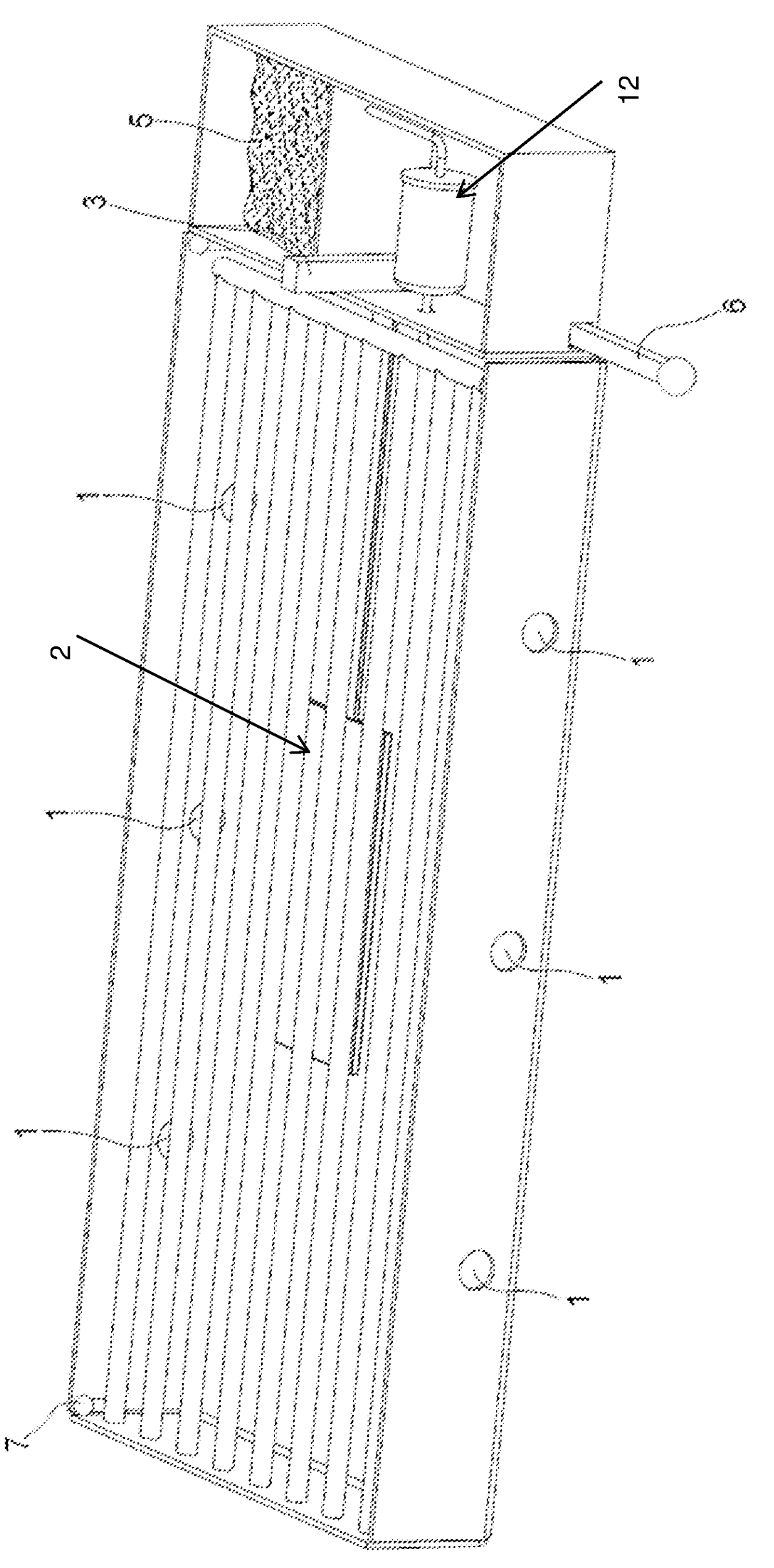
FIG. 2 shows a detail of the barbecue of FIG. 1 wherein the grills were removed.

Along the contiguous vertical walls 40 there are a series of nozzles 1, equidistantly arranged one each other (shown in detail in FIG. 2).

What is defined as a "service compartment" is displaced next to the "cooking compartment"; the "service compartment" includes a container 5 (such as, for example, a tray) capable of containing water, a plurality of pipes (not shown in the figures) connecting the container 5 with the corresponding nozzles 1, and a pump 12 allowing the water transfer from the container 5 to the nozzles 1.

Nozzles 1 are used both for the air delivery and for the water delivery into the empty space 50. Such a water and/or air delivery is remotely managed by the device 4, placed at the service compartment.

The air delivery into the empty space 50, carried out by means of an air compressor (not shown in the figures), facilitates both the combustion initiation of and the fire maintenance. Conversely, the water delivery is useful in case of need to extinguish any flames emitted in the empty space 50, thus avoiding wetting the food being cooked which remains above the empty space 50. Furthermore, it is possible to vaporize the water according to the needs, while cooking.

Figure 5:
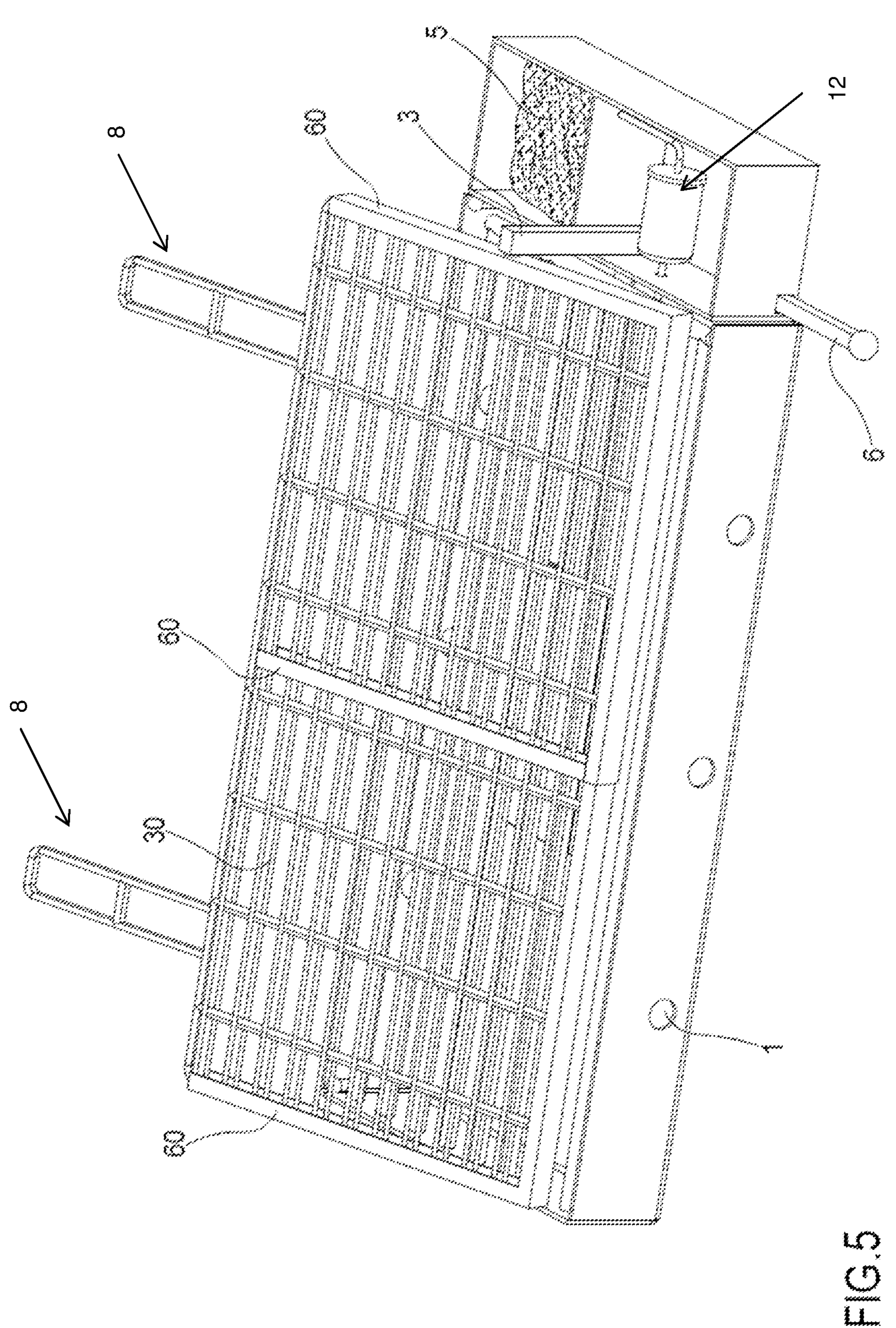
FIG. 5 shows the barbecue of FIG. 1 during the rotation phase of the grill and the components connected to it.

The barbecue 10 shown in FIG. 1 also has a movement system comprising: a) a plate 2 placed under the brazier 20 (better visible in FIGS. 2 and 3), engaging both the brazier 20 and the grill 30, b) a mechanical lever 6 that can be operated by the user placed at the service compartment next to the cooking compartment, c) a bar 3 activated by the movement of the mechanical lever 6 and which transmits the movement to the plate 2 which, in turn, simultaneously activates the 180° rotation of the grill 30 (and with it the rotation of the C-shaped structure wherein the grill 30 is inserted, as shown in FIG. 5) and the brazier 20 scrolling upward and/or downward. This movement system allows the grill 30 up-down overturn.

The barbecue 10 is also provided with tracks (not shown in the figures) adapted to facilitate the upward and downward sliding of the brazier 20. Furthermore, in order to make the brazier 20 stable during movement, stability elements 7, such as for example spheres 7, are placed at each of the brazier corners 20.

Each grill 30 is provided with at least one anti-slip and fireproof handle 8.

The barbecue 10 is also provided with a protection device 9 to protect the barbecue from bad weather. The protection device 9 consists of two elements capable of laterally extending, like wings, so as to be used as a practical support and work surface during use, while they can be returned to the "rest" position (before being extended for use) to facilitate the barbecue transport and storage.

The barbecue 10 also comprises at least one lighting source 13, for example a LED, fixed to a support 14 vertically rising from one of the extendable elements of the protection device 9.

Figure 3:
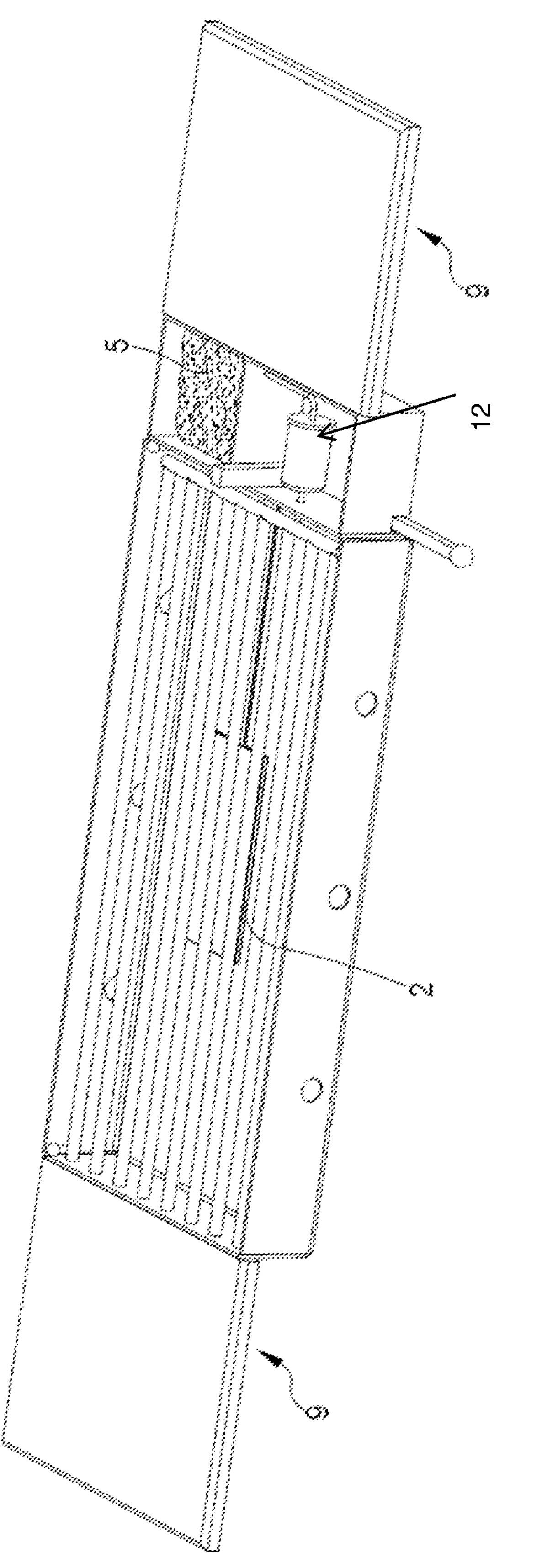
FIG. 3 shows the barbecue of FIG. 2 provided with lateral protecting elements in an open position.
Figure 4:
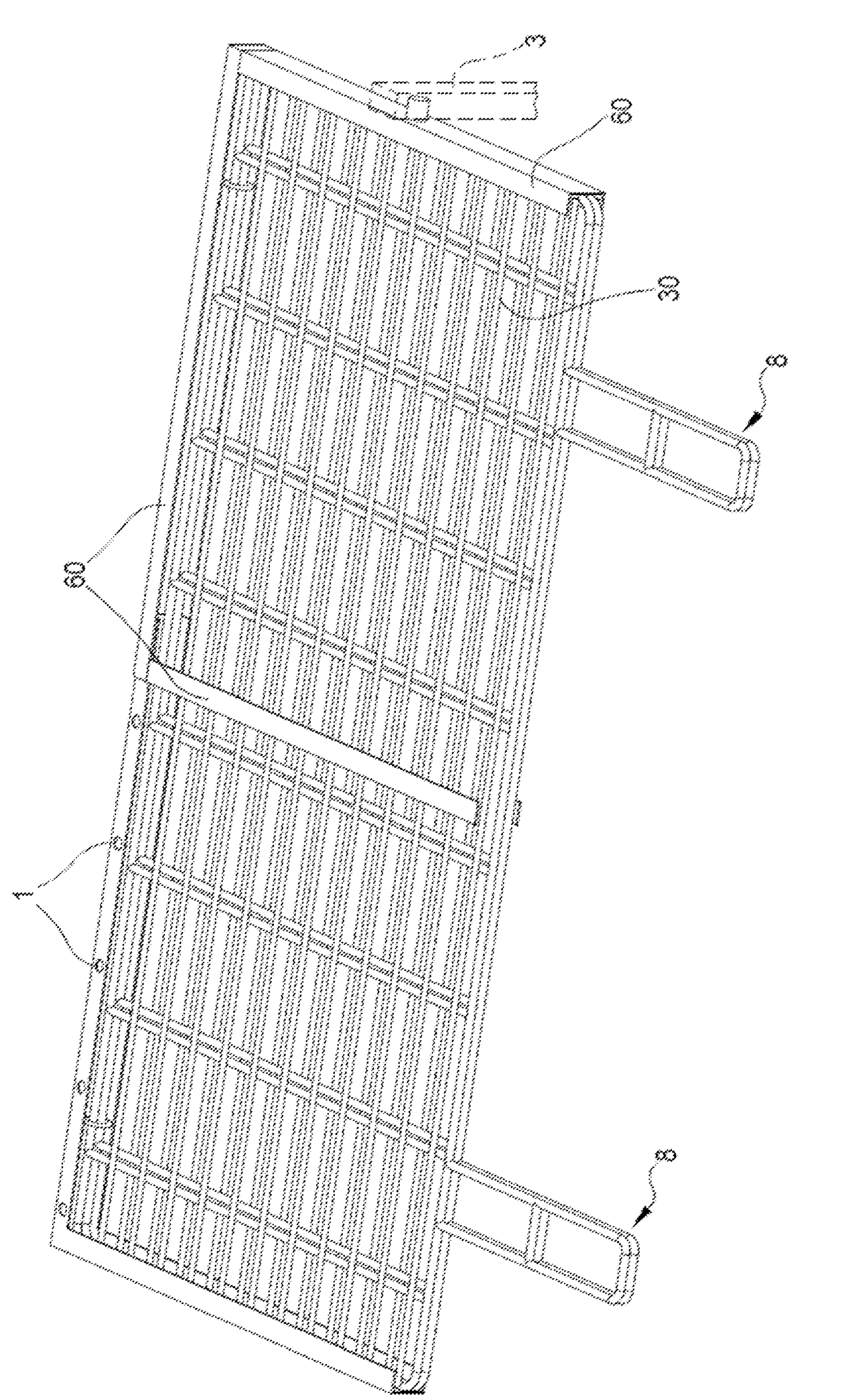
FIG. 4 shows a top view of the grills of the barbecue of FIG. 1.

In the embodiment shown in FIG. 3 two extensible elements of the protection device 9, placed at opposite ends of the brazier 20, are shown in the open position. From each extensible element a support 14 vertically rises; a light source 13 is fixed to the support 14.

This allows the use of the barbecue even in poor light conditions.

The barbecue 10 is also provided with legs 11 acting as a support for the cooking compartment and the service compartment.

In an embodiment not shown in the figures, the barbecue 10 can also be provided with wheels adapted to facilitate its displacement upon inclination.

Of course, many modifications and variations of the described preferred embodiments will be apparent to those skilled in the art, still remaining within the scope of the utility model.

Therefore, the present invention is not limited to the preferred embodiments described, illustrated only by way of non-limiting example, but is defined by the following claims. The present application claims the benefit of priority to IT Application No. 102021000026540, filed Oct. 15, 2021, the entire contents of which are hereby incorporated by reference.

The invention claimed is:

1. A barbecue (10), comprising: a) a brazier (20), b) at least one grill (30) placed above the brazier (20) and suitable for housing the food to be cooked, c) a series of contiguous vertical walls (40) arranged above the brazier (20) and able to surround the brazier (20) itself and to create an empty space (50) interposed between the brazier (20) and the at least one grill (30), d) an air delivery system adapted to deliver air into said empty space (50), e) a water delivery system adapted to deliver water into said empty space (50), wherein said air delivery system and said water delivery system are provided with the same plurality of nozzles (1) arranged at said contiguous vertical walls (40) and adapted to deliver, alternatively, air or water, and (f) a C-shaped support structure (60), fixed to the barbecue (10), suitable for allowing the insertion in it of said at least one grill (30), and supported by a vertical axis (3) allowing its 180° rotation together with said grill (30) inserted in it, wherein said at least one grill (30) consists of two portions of grill connected to each other and adapted to house the food to be cooked at their inside, wherein said barbecue (10) further comprising a movement system capable of simultaneously carrying out a) the 180° rotation of said at least one grill (30) so as to overturn it up-down, and vice versa, and b) sliding upward and/or downward said brazier (20), wherein said movement system comprises: a) a plate (2), able to engage with both said brazier (20) and said grill (30), b) a mechanical lever (6) adapted to be operated by the user, c) a bar (3) adapted to be activated by the movement of said mechanical lever (6) and to transmit to said plate (2) the energy to simultaneously activate said 180° rotation of said at least one grill (30) and said brazier (20) upward and/or downward sliding.

2. Barbecue (10) according to claim 1, wherein said water delivery system further comprising: i) a container (5) adapted to contain water, ii) a plurality of pipes wherein each pipe connects said container (5) with a corresponding nozzle of said plurality of nozzles (1), and iii) a pump (12) allowing the transfer of water from the container (5) to said plurality of nozzles (1).

3. Barbecue (10) according to claim 1, wherein said air delivery system also comprises an air compressor.

4. Barbecue (10) according to claim 1, further comprising a device (4) to directly or remotely manage the air and/or water delivery to said plurality of nozzles (1).

5. Barbecue (10) according to claim 1, wherein said C-shaped support structure (60) is extendable and adjustable in length.

6. Barbecue (10) according to claim 1, further comprising a protection device (9), arranged so as to cover the barbecue, wherein said protection device (9) is provided with two elements, each of them extending laterally in an opposite direction to the other extensible element, with respect to the longitudinal direction of the barbecue (10).

7. Barbecue (10) according to claim 1, further comprising a lighting source (13).

* * * * *